(12) United States Patent
Kamibayashiyama et al.

(10) Patent No.: US 9,752,681 B2
(45) Date of Patent: Sep. 5, 2017

(54) PRECISION FORMED ARTICLE AND METHOD

(75) Inventors: Julian F. Kamibayashiyama, San Diego, CA (US); Jeffrey D. Navarro, Chula Vista, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 794 days.

(21) Appl. No.: 13/102,083

(22) Filed: May 6, 2011

(65) Prior Publication Data

US 2011/0272896 A1    Nov. 10, 2011

Related U.S. Application Data

(60) Provisional application No. 61/332,335, filed on May 7, 2010.

(51) Int. Cl.
  *F16J 15/16* (2006.01)
  *F16J 15/32* (2016.01)
  (Continued)

(52) U.S. Cl.
  CPC ........... *F16J 15/102* (2013.01); *F16J 15/106* (2013.01); *F16J 15/3284* (2013.01);
  (Continued)

(58) Field of Classification Search
  USPC ....... 277/590, 592, 598, 608, 626, 627, 644, 277/648, 649, 650
  See application file for complete search history.

(56) References Cited

U.S. PATENT DOCUMENTS 2,986,372 A     5/1961  Yocum
3,215,442 A *  11/1965  Papenguth .................... 277/611
(Continued)

FOREIGN PATENT DOCUMENTS

JP    2003041238 A    2/2003
WO    2006062929 A1   6/2006
(Continued)

OTHER PUBLICATIONS

Journal of the Royal Society interface; J.R. Society Interface 2007 4,643-648 © 2007—The Royal Society.

*Primary Examiner* — Vishal Patel
*Assistant Examiner* — Stacy Warren
(74) *Attorney, Agent, or Firm* — Renner, Otto, Boisselle & Sklar, LLP (57) ABSTRACT

An elastomeric polymeric seal 10 includes a sealing surface 21 and an adjacent fluid repelling surface 20. The fluid repelling surface 20 is hydrophobic or superhydrophobic and is of substantially greater surface area than sealing surface 21. During manufacture of a silicone wafer 27, sealing surface 21 engages the wafer 27 to seal against leakage of electroplate solution fluid. The repelling surface 20 directs the electroplate solution fluid away from the sealing surface 21 during and after electroplating. The hydrophobic or superhydrophobic repelling surface includes a pattern of micro-pillars 51 and micro-channels between the pillars. The pillars are formed in the base material of the seal by laser ablation of the base material or by molding. Other seals 30 and 90 include a sealing surface and an adjacent hydrophobic or superhydrophobic repelling or stiction reduction surface. A fluidic device 95 includes plates 96 and 97 with micro-channels and micro-pillars.

13 Claims, 13 Drawing Sheets (51) Int. Cl.
*F16J 15/10* (2006.01)
*F16J 15/3284* (2016.01)
*B29C 33/42* (2006.01)
*B29L 31/26* (2006.01)

(52) U.S. Cl.
CPC .... *B29C 33/424* (2013.01); *B29K 2995/0093* (2013.01); *B29L 2031/26* (2013.01)

(56) References Cited

U.S. PATENT DOCUMENTS

| | | | |
|---|---|---|---|
| 3,586,340 A | | 6/1971 | Otto et al. |
| 3,923,315 A | * | 12/1975 | Hadaway ................. 277/559 |
| 4,084,826 A | * | 4/1978 | Vossieck et al. ............. 277/559 |
| 5,002,289 A | * | 3/1991 | Yasui et al. ................. 277/559 |
| 5,589,112 A | | 12/1996 | Spaulding |
| 6,045,138 A | * | 4/2000 | Kanzaki ..................... 277/562 |
| 6,149,160 A | | 11/2000 | Stephens et al. |
| 6,189,896 B1 | * | 2/2001 | Dickey et al. ............... 277/608 |
| 6,280,090 B1 | | 8/2001 | Stephens et al. ............. 384/284 |
| 6,481,720 B1 | * | 11/2002 | Yoshida et al. .............. 277/400 |
| 6,494,462 B2 | * | 12/2002 | Dietle ........................ 277/549 |
| 6,588,340 B2 | | 7/2003 | Friedman |
| 6,631,977 B2 | | 10/2003 | Andrews |
| 6,663,110 B2 | | 12/2003 | Platner |
| 6,923,216 B2 | * | 8/2005 | Extrand et al. .................. 138/39 |
| 7,194,803 B2 | | 3/2007 | Young et al. |
| 7,284,758 B1 | * | 10/2007 | Hart et al. .................... 277/321 |
| 7,396,016 B2 | * | 7/2008 | Liao et al. .................... 277/353 |
| 2003/0106831 A1 | * | 6/2003 | Eggum ........................ 206/711 |
| 2006/0022411 A1 | | 2/2006 | Beardsley et al. |
| 2006/0078724 A1 | | 4/2006 | Bhushan |
| 2007/0012618 A1 | | 1/2007 | Swenson |
| 2007/0029739 A1 | | 2/2007 | Jeanmart et al. |
| 2007/0216111 A1 | * | 9/2007 | Matsui .......................... 277/647 |
| 2007/0261224 A1 | * | 11/2007 | McLeod ......................... 29/428 |
| 2008/0088094 A1 | * | 4/2008 | Borowski et al. ............ 277/559 |
| 2008/0093808 A1 | | 4/2008 | Quick et al. |
| 2010/0028604 A1 | | 2/2010 | Bhushan et al. |

FOREIGN PATENT DOCUMENTS

WO    WO 2007035511 A2 * 3/2007
WO    WO 2010105782 A1 * 9/2010

* cited by examiner

| SAMPLE | MEDIA | RIGHT ANGLE | LEFT ANGLE | MEAN |
|---|---|---|---|---|
| V8562 BARE | DI H2O | 92.4 | 88.6 | 90.5 |
| V8562 BARE | DI H2O | 84.0 | 83.4 | 83.7 |
| V8562 PATTERN | DI H2O | 156.0 | 156.0 | 156.0 |
| V8562 PATTERN | DI H2O | 156.8 | 156.3 | 156.5 |

FIG. 23

| SAMPLE | MEDIA | RIGHT ANGLE | LEFT ANGLE | MEAN |
|---|---|---|---|---|
| V8562 BARE | DI H2O | 92.4 | 88.6 | 90.5 |
| V8562 BARE | DI H2O | 84.0 | 83.4 | 83.7 |
| V8562 OFFSET PATTERN | DI H2O | 139.0 | 141.0 | 140.0 |
| V8562 OFFSET PATTERN | DI H2O | 150.0 | 156.3 | 153.15 |

PRECISION FORMED ARTICLE AND METHOD

TECHNICAL FIELD

This invention relates to a precision formed elastomeric polymeric article and to a method of forming such article.

BACKGROUND OF THE INVENTION

Microstructure articles are used in a wide variety of applications.

Microstructure articles having water repellant surfaces are disclosed in Bhushan, B., et. al., "Toward optimization of patterned superhydrophobic surfaces," Journal of the Royal Society publication Interface at J.R.Soc. Interface 2007 4 643-648, and in Bhushan, et. al., US patent application publication 2006/0078724 A 1 (collectively, "Bhushan"), the disclosures of which are expressly incorporated herein by reference. Bhushan describes patterned surfaces with discrete cylindrical pillars of different diameters, heights, and pitch distances, compares experimental data to theoretical calculation, and identifies a non-geometrical parameter that is reported to be responsible for wetting properties. Bhushan further describes that a single-crystal silicone structure that is initially hydrophilic can be made hydrophobic by coating it with a self-assembled monolayer. Bhushan further describes that a self-assembled monolayer of 1,1,2,2 tetrahydroperfluorodecyhrichlorosilane may be deposited on a sample surface using vapor-phase deposition. Bhushan also describes using photolithography in the fabrication of the superhydrophobic pattern.

Microstructure articles are also used to provide microfluidic circuits. U.S. Pat. Nos. 7,244,961 B1 and 6,423,273 B1 and U.S. Patent Application No. 2003/0206832 A1, the disclosures of which are expressly incorporated herein by reference, disclose microfluidic components and methods for producing those components. The components include continuous micro-pillars and micro-channels that are fabricated into silicon, quartz, glass, ceramics, plastic or other materials. The size of the channels is on the order of micrometers, and the volumes of fluids are on the order of nanoliters or microliters.

SUMMARY OF THE INVENTION

The present invention provides a precision formed article and a method for making a precision formed article. Specifically, the invention provides an applied network of extremely small scale pillars and channels utilized with formable elastomeric polymeric materials. The term "elastomeric polymeric material" as used herein means a polymer with the property of elasticity and generally with a low Young's modulus and high yield strain compared to other materials, including thermosetting materials, thermoplastic materials, and composite thermosetting and thermoplastic materials. The term "formable" as used herein means capable of being formed into a defined shape by a rigid mold having the negative image of the defined shape and retaining the defined shape when removed from the mold.

The formable elastomeric polymeric materials with precision formed pillars and channels according to certain aspects of this invention may enable two capabilities. First, the channels, when ordered into a specific orderly pattern on a surface of a formable elastomeric material, not only increases the hydrophobic or super-hydrophobic effect, but when applied adjacent a sealing surface of a formable elastomeric seal base material may enhance the sealing properties of the sealing surface. Second, the channels may provide a platform for increased precision of fluid flow for tighter response in logic applications and may allow for smaller volumes of fluid to be utilized in fluid control systems. A fluidic micro-channel, particularly of the sub 50 micron size, may be arranged into a network on a single plane or multiple planes with elastomeric compression areas isolating the fluid channel without requiring adhesion of multiple planes of fluidic networks. This architectural freedom may expand the permutations of fluidic control paths and networks that can be created by strategic rotations of the multiple planes in respect to each other.

The invention further provides various ones of the features and structures and methods described above in the claims set out below, alone and in combination, and the claims are incorporated by reference in this summary of the invention.

BRIEF DESCRIPTION OF THE DRAWINGS

Embodiments of this invention will now be described in further detail with reference to the accompanying drawings, in which.

DETAILED DESCRIPTION OF THE INVENTION

Figure 1:
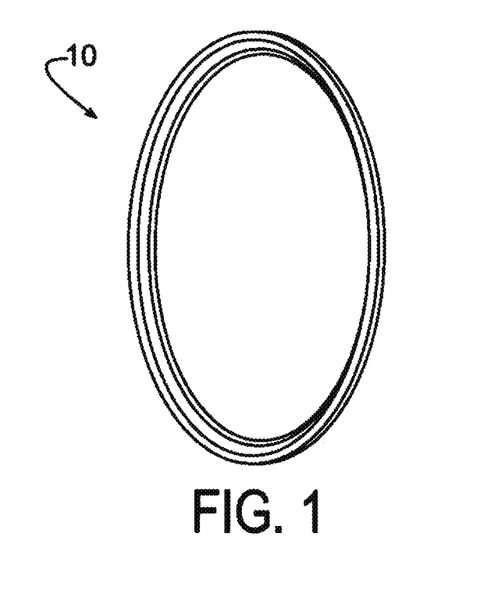
FIG. 1 is a perspective view of a first preferred embodiment of a seal article according to certain aspects of the present invention.
Figure 2:
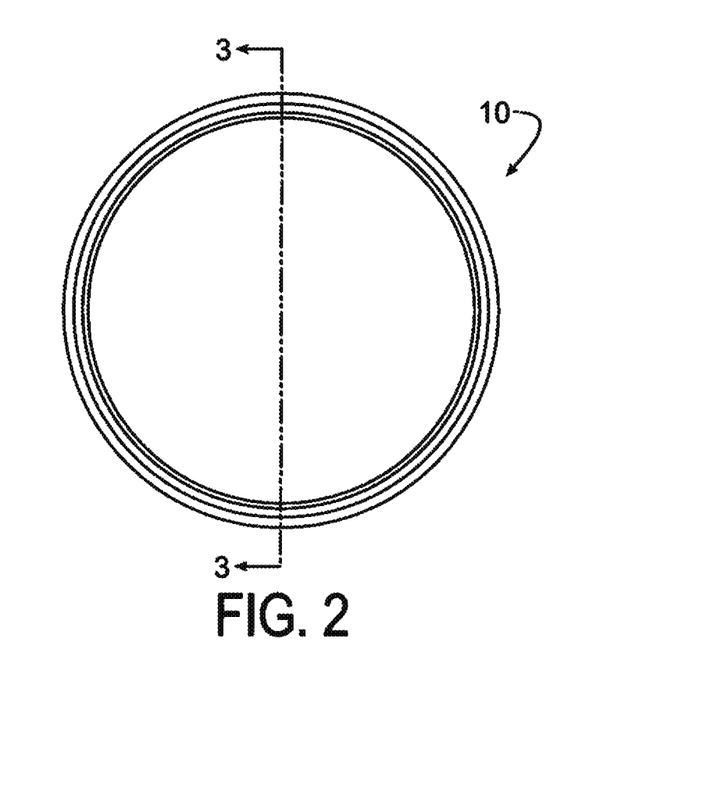
FIG. 2 is a front elevation view of the seal shown in FIG. 1.
Figure 3:
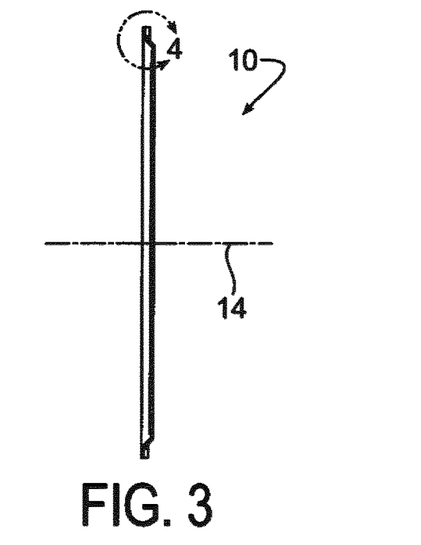
FIG. 3 is a cross sectional view taken along reference view line 3-3 in FIG. 2.

Referring now to the drawings in greater detail, FIGS. 1-5 illustrate a preferred embodiment of a seal article 10 according to certain aspects of the present invention. The seal 10 includes a formable elastomeric polymeric body 11 and a metallic carrier ring 12. As best illustrated in FIGS. 1 and 2, both the body 11 and the ring 12 are of annular shape and have a central longitudinal axis 14.

The elastomeric polymeric body 11 is preferably of fluoropolymer material in the preferred embodiment. Specifically, the body 11 is preferably of the perfluoroelastomer material designated V8562-75 available from Parker-Hannifin Corporation, headquartered in Cleveland, Ohio. Alternatively, the body 11 may be of other formable elastomeric polymeric material that may be selected based upon the chemicals, temperatures, pressures and other operating conditions of the application in which the seal 10 is to be utilized and to which the seal 10 is to be exposed. Such alternative materials include other thermosetting materials, thermoplastic materials and/or composite materials. The metallic ring 12 is preferably of stainless steel, and in the preferred embodiment the ring 12 is of American Society of Testing Materials type 316L stainless steel. Alternatively, the ring 12 may be of any other material, and is preferably of a material that is relatively rigid in comparison to the material of the body 11 and that is selected according to the aforementioned selection criteria. The ring 12 provides a carrier for the body 11 and is secured to the body 11 by a suitable adhesive or by any other known method.

Figure 4:
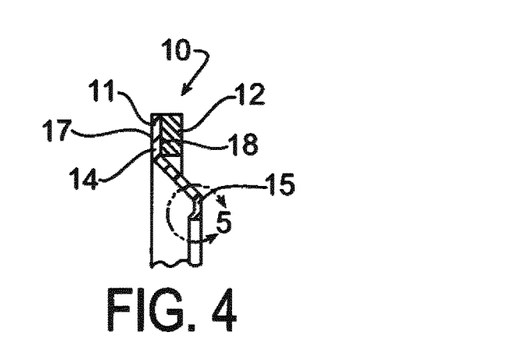
FIG. 4 is an enlarged cross sectional view of the portion of FIG. 3 indicated by reference view line 4.

As best shown in FIG. 4, the body 11 includes longitudinally facing opposite surface portions 17 and 18. The body 11 also includes a generally flat radially extending annular outer wall 14 that is substantially coextensive with the ring 12. The body 11 also includes a generally flat radially extending annular inner wall 15 disposed radially inwardly of the outer wall 14. A connecting wall extends between and connects the outer wall 14 and inner wall 15. The inner wall 15 terminates at an innermost longitudinally extending wall 16. The wall 16 includes a generally cylindrical radially inwardly facing surface portion 20 and a longitudinally facing annular sealing surface portion 21 substantially adjacent the surface portion 20.

Figure 5:
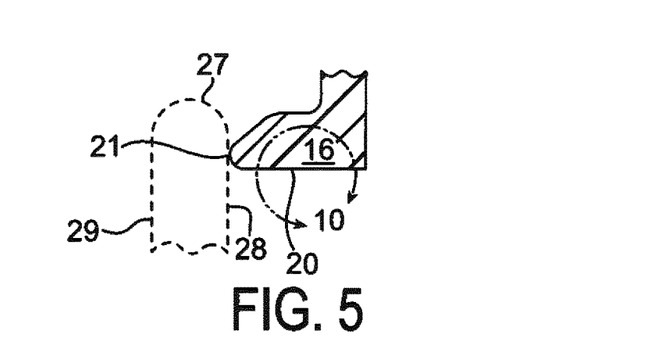
FIG. 5 is a further enlarged cross sectional view of the portion of FIG. 4 indicated by reference view line 5.
Figure 6:
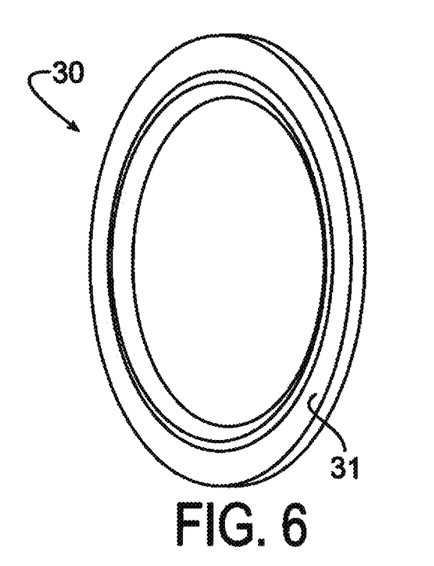
FIG. 6 is a perspective view of another embodiment of a seal article according to certain aspects of the present invention.
Figure 7:
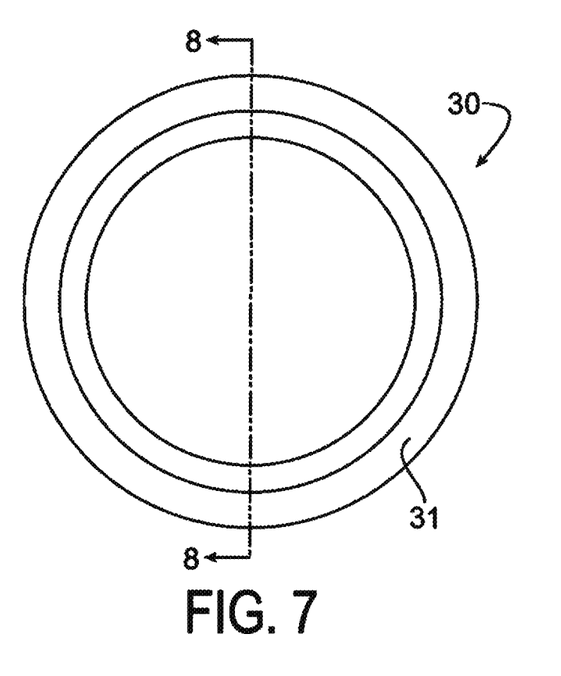
FIG. 7 is a front elevation view of the seal shown in FIG. 6.
Figure 8:
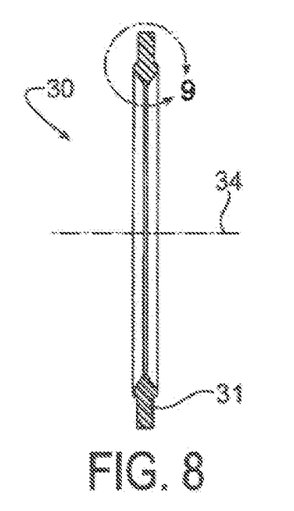
FIG. 8 is a cross sectional view taken along reference view line 8-8 in FIG. 7.

In the preferred embodiment, the seal 10 may be utilized in manufacturing equipment for the manufacture of integrated circuit silicon wafers. During manufacturing, one side of each silicon wafer may be submerged in and exposed to a liquid reservoir of precious metal electroplate solution in a well known manner. The seal 10 in such application may be used to seal against such one side of the silicon wafer. The radially inner wall 16 in such application provides a lip seal and defines a circular opening through which the electroplate solution reaches the one side of the silicon wafer. The longitudinally facing sealing surface portion 21 of the lip seal inner wall 16 engages and seals against the one side of the silicon wafer with a slight compression force, to prevent the electroplate solution from leaking past the intersection of the silicon wafer and the surface 21. This application is illustrated in FIG. 5. As shown in FIG. 5, a portion of a generally flat disk shaped silicon wafer 27 is illustrated in dotted line outline, with the above described one side 28 of the silicon wafer 27 engaging the sealing surface 21 of the seal 10 with sealing contact. The one side 28 of the silicon wafer 27 may be exposed to electroplate solution through the circular opening defined by the radially facing inner wall 16 and the surface 20 of the wall 16. The seal created at the annular intersection of the annular sealing surface 21 of the wall 16 and the one side 28 precludes leakage of the electroplate solution (not shown) and prevents the electroplate solution from contacting the other side 29 of the silicon wafer 27.

Figure 9:
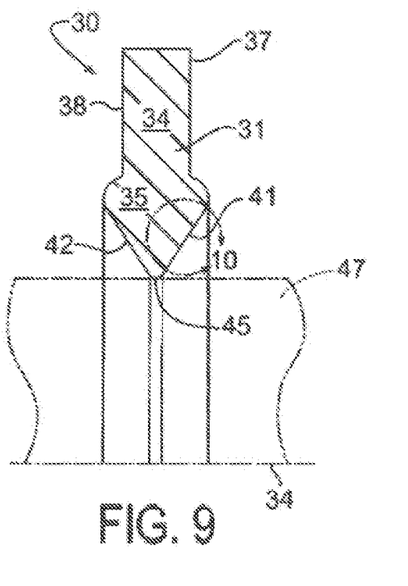
FIG. 9 is an enlarged cross sectional view of the portion of FIG. 8 indicated by reference view line 9.

The seal 10 may alternatively be utilized in any other static or dynamic application, may be used with or without a carrier ring, and may have any of numerous well known cross sections. For example, an alternative embodiment of a seal according to certain aspects of this invention is illustrated in FIGS. 6-9. This alternative embodiment provides a seal 30 that includes a formable elastomeric polymeric body 31. The body 31 is of annular shape and has a central longitudinal axis 34. The elastomeric polymeric material for the body 31 is selected based upon the criteria described above with respect to seal 10. As best shown in FIG. 9, the body 31 includes longitudinally facing opposite surface portions 37 and 38. A generally flat radially extending annular outer wall 34 is disposed radially outwardly of an annular inner wall 35. The surface portion 37 of the inner wall 35 includes a tapered annular surface portion 41. Similarly, the surface portion 38 of the inner wall 35 includes a tapered annular surface portion 42. The surface portions 41 and 42 of the inner wall 35 terminate at and are substantially adjacent an innermost longitudinally extending cylindrical sealing surface 45. The seal 30 may be utilized in numerous applications. For example, the seal 30 may be used with a cylindrical shaft 47, shown in dotted outline in FIG. 9. In this application, the sealing surface 45 engages the cylindrical outer peripheral surface of the shaft 47 and prevents leakage of fluid (not shown) from the right side of the seal 30 to the left side of the seal 30. The tapered surface 41 in this application is exposed to the fluid on the right side of the seal 30, and the sealing surface 45 sealingly engages the shaft 47 with a compression force.

With respect to the seal 10 illustrated in FIGS. 1-5, the surface portion 20 (which as described above is substantially adjacent the sealing surface 21 and is exposed to the fluid that is to be sealed by the sealing surface 21) is according to certain aspects of the present invention hydrophobic or superhydrophobic. Similarly, with respect to the seal 30 illustrated in FIGS. 6-9, the sealing surface 41 (which as described above is substantially adjacent the sealing surface 45 of the seal 30 and is exposed to the fluid that is to be sealed by the sealing surface 45) is according to certain aspects of the present invention hydrophobic or superhydrophobic. To provide sufficient hydrophobic or superhydrophobic surface areas to repel the fluid that is to be sealed away from the substantially adjacent sealing surface, the surface area of each hydrophobic or superhydrophobic surfaces 20 and 41 is preferably substantially greater than the surface area of its substantially adjacent sealing surface 21 and 45, respectively. Most preferably, the surface area of each hydrophobic or superhydrophobic surface 20 and 41 is substantially greater than two times the surface area of its substantially adjacent sealing surface 21 and 45, respectively.

Figure 10:
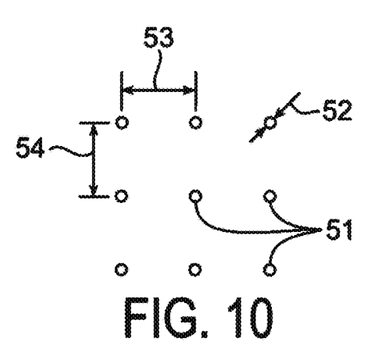
FIG. 10 is an enlarged diagrammatic illustration, in elevation, of a portion of a surface of the seals illustrated in FIGS. 1-9, indicated by reference view line 10 in FIGS. 5 and 9.
Figure 11:
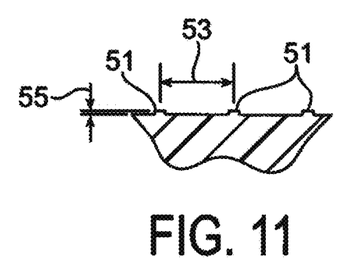
FIG. 11 is another enlarged diagrammatic illustration, in cross section, of the portion of the surfaces illustrated in FIG. 10.
Figure 18:
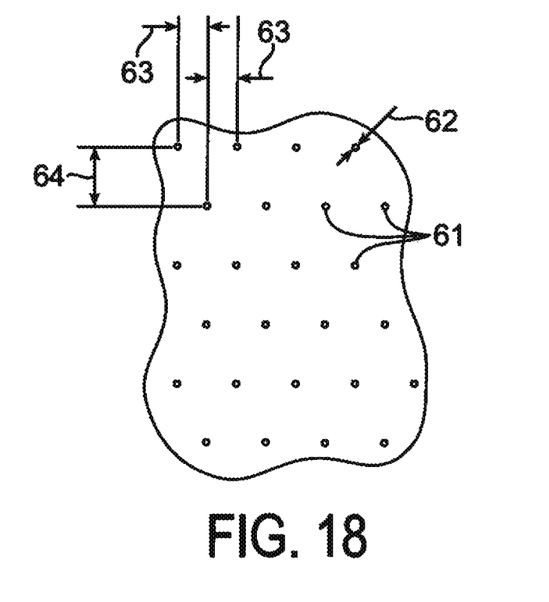
FIG. 18 is a enlarged diagrammatic illustration of an alternative pattern for the surface portions indicated by reference view line 10 in FIGS. 5 and 9.
Figure 19:
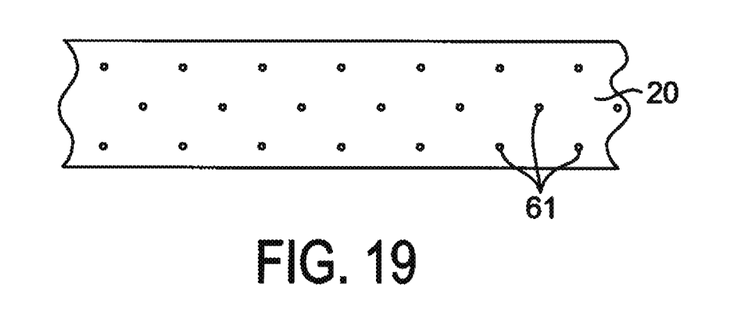
FIG. 19 is another diagrammatic illustration of the alternative pattern illustrated in FIG. 18, showing the pattern on a segment of a seal article.
Figure 28:
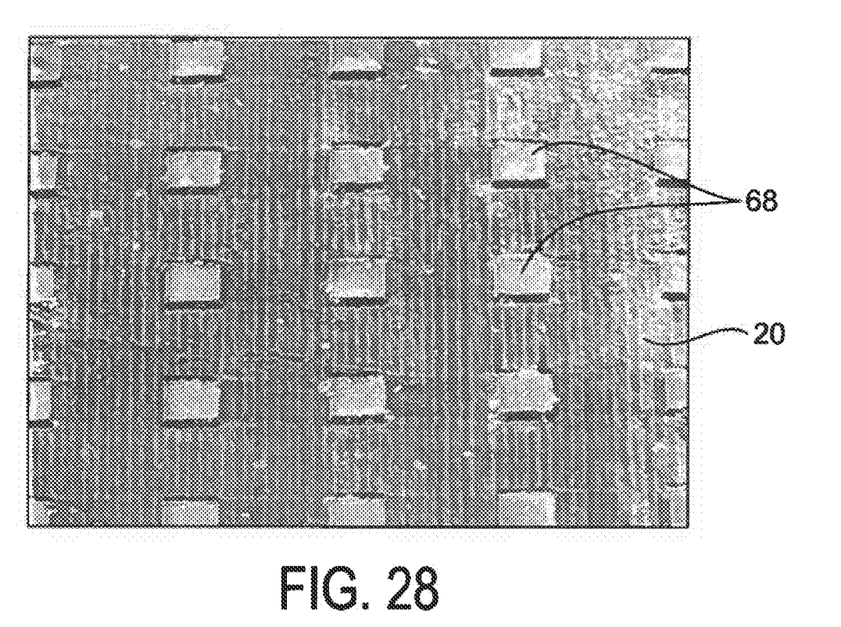
FIG. 28 is an enlarged scanning electron microscope image, in elevation, showing another alternative pattern of the surface portion indicated by reference view line 10 in FIG. 5 taken from a test strip.

The hydrophobic or superhydrophobic surfaces 20 and 41 may have a predetermined pattern of pillars and channels. This pattern, which covers substantially the entirety of the surfaces 20 and 41, is provided in the base material of the seal bodies 11 and 31 and is illustrated in FIGS. 10 and 11. While any surface that creates a hydrophobic or superhydrophobic surface may be utilized, a first preferred hydrophobic or superhydrophobic surface pattern is illustrated in FIGS. 10, 11. Further, an alternative preferred pattern is illustrated in FIG. 18, and another alternative preferred pattern is illustrated in FIG. 28. As illustrated in FIGS. 10 and 11, the first preferred pattern includes a substantially continuous pattern that extends over substantially the entirety of the surfaces 20 and 41. The pillars used in this pattern are generally circular discrete pillars 51 but may be of any other desired cross section. The pillars 51 in the first preferred pattern have a diameter 52 of about 0.0015 inch to about 0.0020 inch. The pillars 51 are arranged in columns that are spaced apart a distance 53 of about 0.0135 inch and in rows that are spaced apart a distance 54 of about 0.0135 inch. The pillars 51 have a height 55 of about 0.0005 inch. The pillars 51 are arranged in aligned rows and columns, with each pillar in each row and column being aligned. As illustrated in FIG. 18, an alternative pattern also includes a substantially continuous pattern that extends over substantially the entirety of the surfaces 20 and 41. The pillars 61 provided in this alternative pattern are generally circular discrete pillars 61 but may be of any other desired cross section. The pillars 61 in the alternative pattern have a diameter 62 of about 0.0015 inch to about 0.0020 inch. The pillars 61 are arranged in columns that are spaced apart a distance 63 of about one half the distance 53. The pillars 61 are arranged in rows that are spaced apart a distance 64 of about the same as distance 63. The pillars 61 have a height 55 of about 0.0005 inch. The pillars 61 are arranged in offset rows and columns, with each pillar in each row and column being offset from each pillar in an adjacent row and column. This design of the alternative pattern provides a pillar diameter and distance between any two adjacent pillars (whether or not in the same row) that is always the same distance. This alternative pattern allows size proportions for the pillars 63 that provide a hydrophobic or superhydrophobic effect, while accommodating those size proportions in a constrained small surface area such as the surface area of the surfaces 20 and 41. For example, FIG. 19 illustrates this alternative pattern as applied to the surface 20. As illustrated in FIG. 28, another alternative pattern includes a substantially continuous pattern that extends over substantially the entirety of the surface 20. The pillars 68 provided in this other alternative pattern are generally rectangular discrete pillars 68. The pillars 68 in this alternative pattern are square and have a length and width of about 0.0015 inch to about 0.0020 inch. The pillars 68 are arranged in columns and rows that are spaced apart a distance equal to the above mentioned distance 53. The pillars 68 have a height equal to the above mentioned height 55. This alternative pattern illustrates that geometric pillar shapes other than cylindrical may be provided.

The hydrophobic or superhydrophobic surface, as described above, is formed on a surface of the seal 10 or 30 that is exposed to a fluid to be sealed and that is substantially adjacent the sealing surface of the seal. The formed hydrophobic or superhydrophobic surface may repel such fluid away from the sealing surface in a semi-controlled manner to areas that may be more acceptable for fluid accumulation. Additionally, this may direct fluid away from the sealing surface or other surface of the seal to reduce fluid reaction with the seal. Still further, this may direct fluid away from the sealing surface or other surface of the seal to reduce fluid reaction with the environment that may lead to caking or gumming or corrosion buildup. When the seal 10 is utilized in the manufacture of silicon wafers as described above, the hydrophobic or superhydrophobic surface may tend to repel the electroplating solution away from the sealing surface 21 when the wafer is removed from the electroplate solution. This may reduce any tendency for the electroplate solution to wick into the contact area between the sealing surface 21 and the wafer 27, such as might otherwise tend to occur such as when the seal 21 is moved away from the silicon wafer 27 at the completion of the electroplating step in such manufacture. Accordingly, the hydrophobic or superhydrophobic surfaces 20 and 41 may provide fluid repelling surfaces that repel fluid away from their respective substantially adjacent sealing surfaces 21 and 45.

Figure 14:
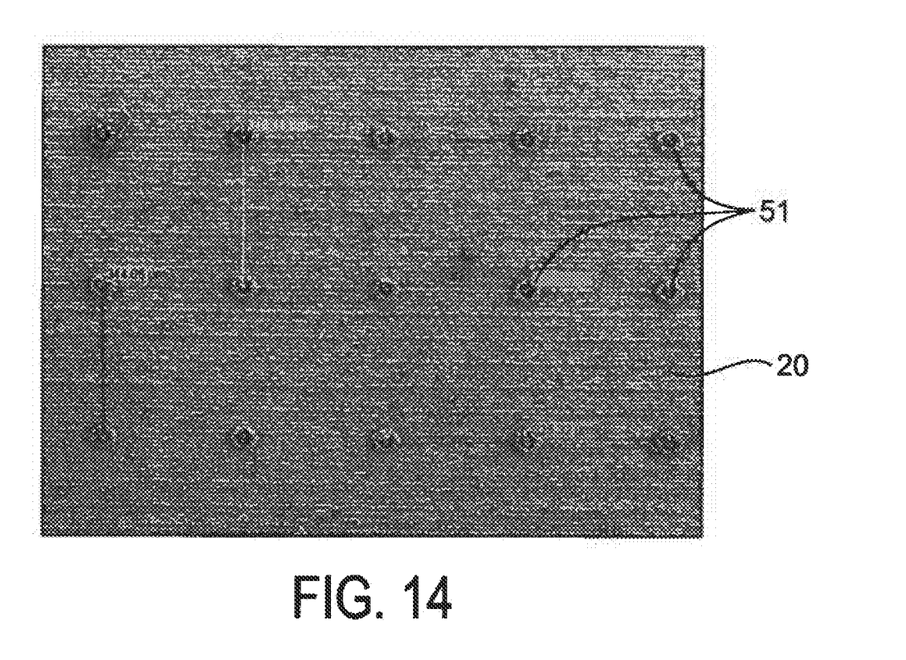
FIG. 14 is an enlarged scanning electron microscope image, in elevation, of the surface portions indicated by reference view line 10 in FIGS. 5 and 9 taken from a test strip.
Figure 15:
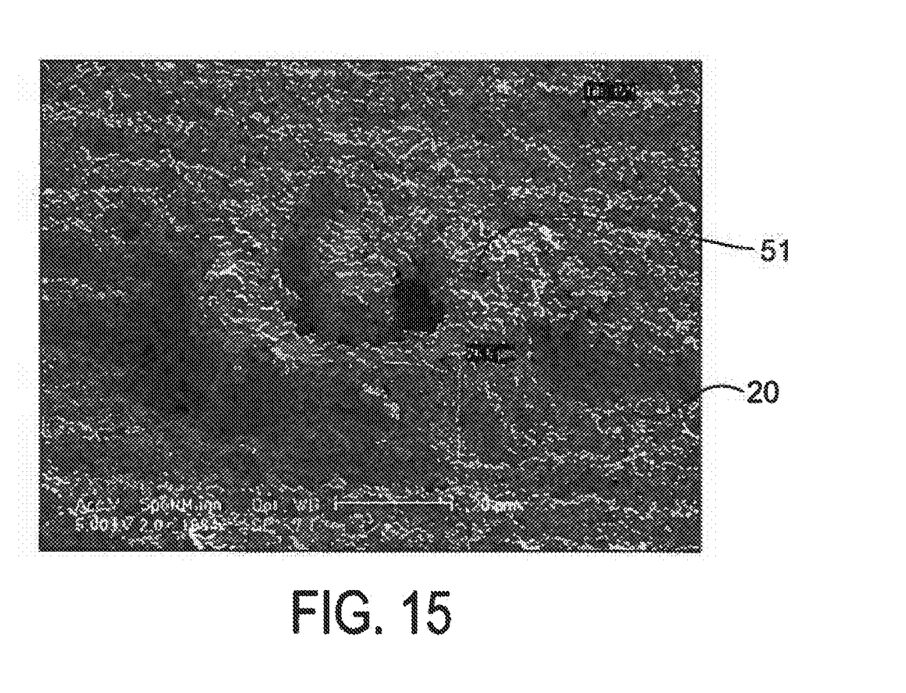
FIG. 15 is a further enlarged scanning electron microscope image, in elevation at approximately a 45 degree angle to the surface, of one of the pillars shown in FIG. 14.
Figure 16:
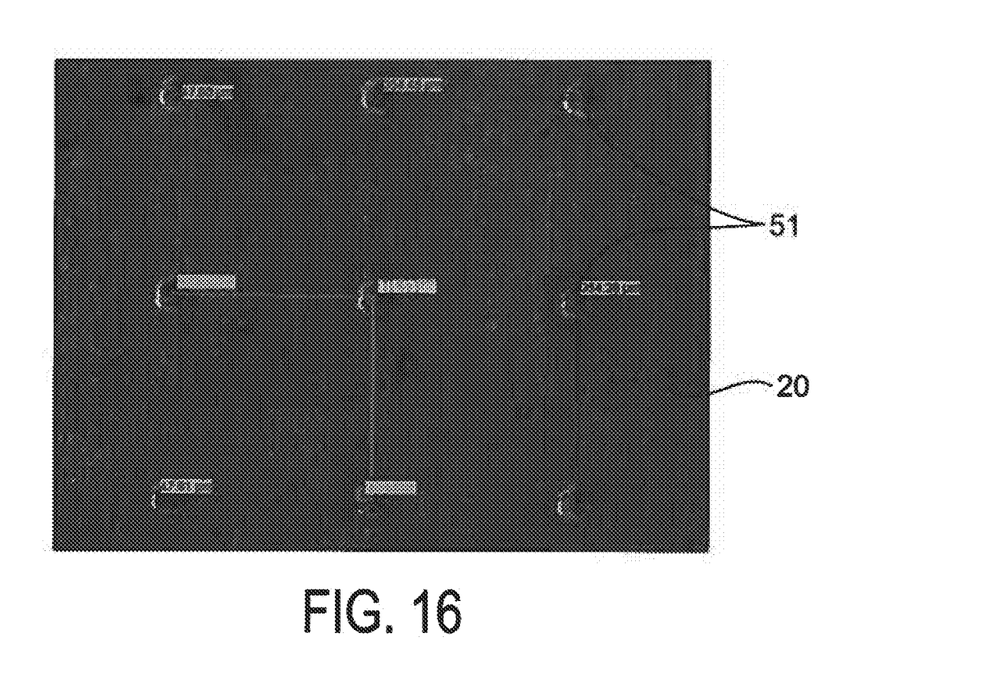
FIG. 16 is an enlarged scanning electron microscope image, in elevation, of a laser machined pattern for the mold surface illustrated diagrammatically in FIGS. 12 and 13.
Figure 17:
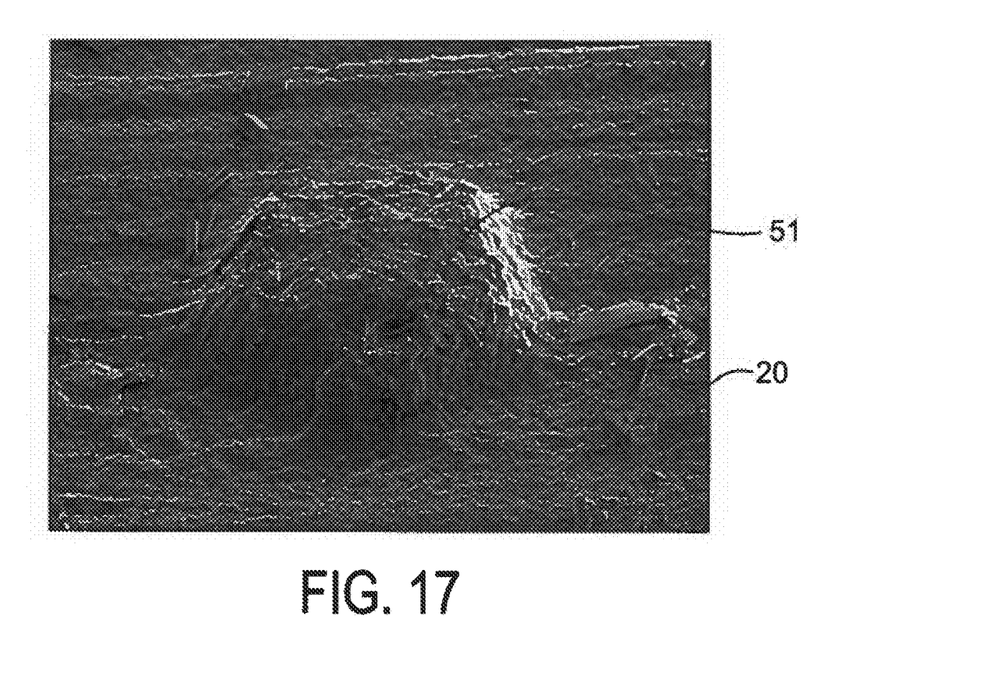
FIG. 17 is an enlarged scanning electron microscope image, in elevation at approximately a 45 degree angle to the surface, of a pillar of a pattern formed in a test strip by the mold surface illustrated in FIG. 16.

According to a first method of producing the patterns of pillars 51 (as illustrated in FIGS. 10 and 11) and 61 (as illustrated in FIGS. 18 and 19) and 68 (as illustrated in FIG. 28), a laser is used to ablate the portion of the surface 20 of the seal body 11 and the portion of the surface 41 of the seal 30 intermediate the pillars 51 or 61, to define such pillars. The resulting patterns of pillars and intermediate spaces or channels are shown in the scanning electron microscope images shown in FIGS. 14, 15 and in FIG. 28. It is noted that FIGS. 14 and 15 show a horseshoe shaped indentation extending from the top surface of each pillar 51. It is believed this horseshoe shaped indentation may result from the laser ablation process. When the images shown in FIGS. 14, 15 and in FIG. 28 are compared to similar electron scanning images of patterns formed by conventional processes such as photolithography on a layer of material deposited on a base material as described in Bhushan, it is apparent that the hydrophobic or superhydrophobic surface patterns created by laser ablation of the base material are similar to the patterns created by conventional processes.

Figure 20:
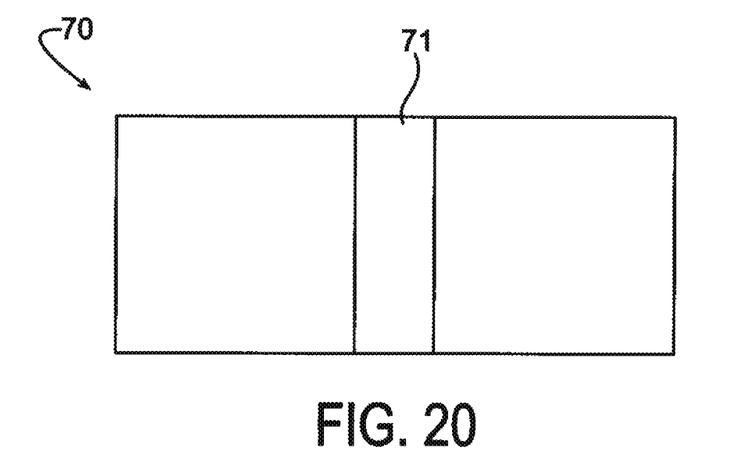
FIG. 20 is a front elevation view of a test strip having a surface portion with a pattern according to certain aspects of the present invention and with another surface portion that does not have the pattern.
Figure 21:
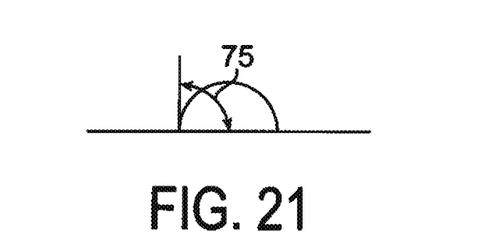
FIG. 21 is a diagrammatic illustration of a droplet of distilled water on the surface portion of the test strip illustrated in FIG. 20 that does not have the pattern according to certain aspects of the present invention.
Figure 22:
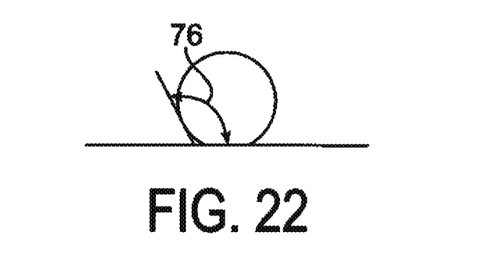
FIG. 22 is a diagrammatic illustration of a droplet of distilled water on the surface portion of the test strip illustrated in FIG. 20 that does have the pattern according to certain aspects of the present invention.
Figure 23:
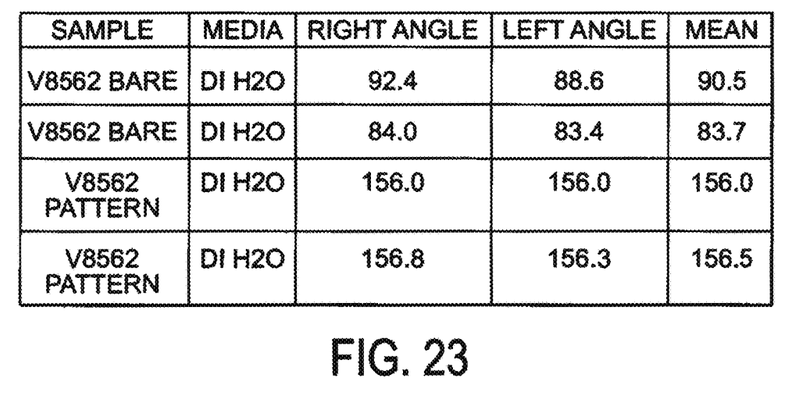
FIG. 23 is a chart showing actual contact angle measurements for the droplet of distilled water illustrated in FIGS. 21 and 22, when the pattern formed on the test strip is the pattern illustrated in FIGS. 10, 11, 14 and 15.
Figure 24:
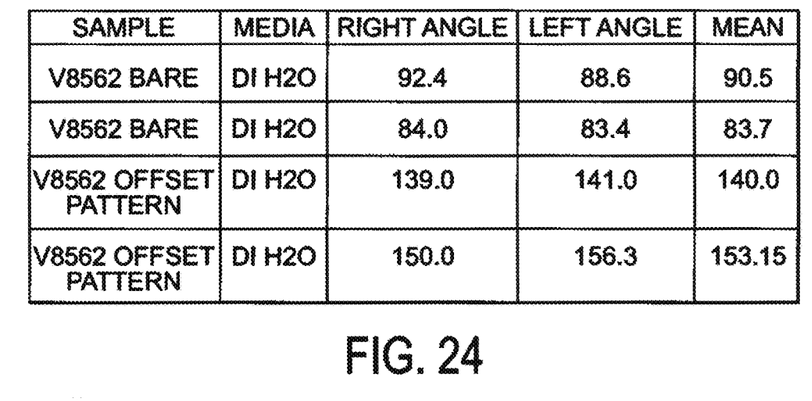
FIG. 24 is a chart showing actual contact angle measurements for the droplet of distilled water illustrated in FIGS. 21 and 22, when the pattern formed on the test strip is the pattern illustrated in FIGS. 18 and 19.

Referring now to FIGS. 20-22, a test strip 70 of the perfluoropolymer material of the seals 10 and 30 (that is, the perfluoropolymer material designated V8562-75 available from Parker-Hannifin Corporation, headquartered in Cleveland, Ohio) is illustrated in FIG. 20. The test strip 70 is about 2.4 inch long and about 1.0 inch high. A pattern of either the first mentioned pattern above (that is, the pattern of FIGS. 10, 11) or the alternative mentioned pattern above (that is, the pattern of FIGS. 18, 19) or the other alternative mentioned pattern above (that is, the pattern of FIG. 28) was formed at area 71 on the surface of the test strip 70 while no pattern was formed on the remainder of the surface of the test strip 70. A droplet of distilled water was applied to the surface that had no pattern, and the contact angle 75 (FIG. 21) was measured. The measured contact angles on the right and left sides of the distilled water droplet (referred to as "DI H2O") are shown in the first two rows of FIG. 23 and in the first two rows of FIG. 24. The same procedure was utilized to determine the water droplet contact angle for the patterned surface 71, and the water droplet contact angle 76 (FIG. 22) was measured. When the patterned surface 71 is the first described pattern (FIGS. 10, 11), the contact angle measurements are shown in the bottom two rows in FIG. 23. When the patterned surface 71 is the second described pattern (FIGS. 18, 19), the contact angle measurements are shown in the bottom two rows in FIG. 24. These results further show that a hydrophobic or superhydrophobic surface is created by the seal surface laser ablation process described above. Also, by comparing the results shown in FIG. 23 with those shown in FIG. 24, it is seen that the results are substantially similar and that the alternative pattern provides a hydrophobic or superhydrophobic surface on a constrained surface area.

Figure 12:
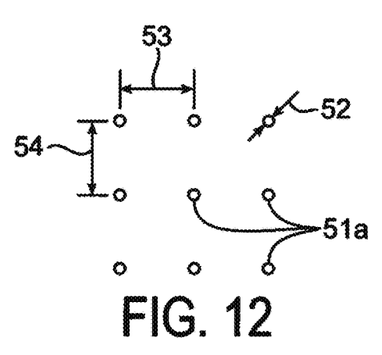
FIG. 12 is an enlarged diagrammatic illustration, in elevation, of a portion of a surface of a mold that may be used in the manufacture of the seal surface portion illustrated in FIGS. 10 and 11.
Figure 13:
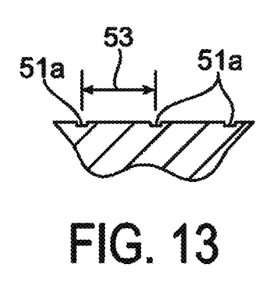
FIG. 13 is another diagrammatic illustration, in cross section, of the surface of the mold illustrated in FIG. 12.
Figure 25:
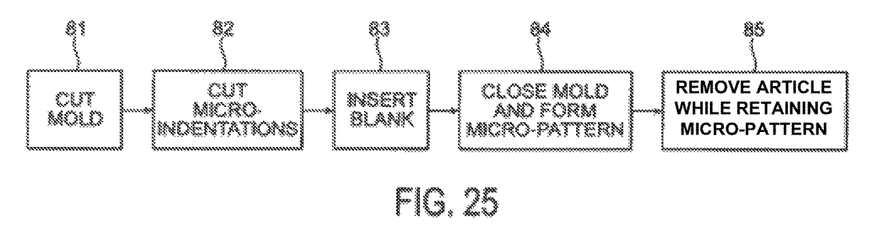
FIG. 25 is a flow chart illustration of a method according to certain aspects of the present invention.

Referring now to FIGS. 12 and 13, a negative image of the pattern illustrated in FIGS. 10 and 11 is shown. This negative image may be formed in a steel mold insert for a mold in which the seal 10 or 30 is formed according to certain aspects of the present invention. The mold insert is illustrated in FIGS. 12 and 13, with a pattern of blind bores 51a corresponding to the pattern of pillars 51 described above. Alternatively, a pattern of blind bores corresponding to the pattern of pillars 61 or corresponding to the pillars 68 could be provided in the mold insert. The mold insert with the pattern illustrated in FIGS. 12 and 13 is used in a molding process to form the first or alternative hydrophobic or superhydrophobic pattern in the surfaces 20 or 41. When the mold is closed, the formable elastomeric polymeric material of the surfaces 20 or 41 is forced into the holes 51a to form the pillars 51. After molding, the mold is opened, and the pillars 51 are retained in the surfaces 20 or 41. This eliminates the laser ablation of the seal material process described above. The laser ablation is applied to the mold insert, and the pillars 51 or 61 are repeatably formed during the molding process. This process is illustrated in FIG. 25, in which conventional mold cutting is illustrated in step 81. The laser ablation cutting of the micro-indentations 51a in otherwise conventional mold inserts is illustrated in step 82. A known preformed blank of seal material is inserted into the mold at step 83, and the mold is closed at step 84 to force the seal material into the micro-indentations 51a and form the pillars 51. The molded article with the micro-pattern retained is then removed from the mold in step 85. To form a seal 10 or 30 with the alternative pattern described above (FIGS. 18, 19), the same process is utilized except that a negative image of the alternative pattern is formed by laser ablation on the appropriate mold surface. Also, while laser ablation is preferably used to form the described micro-indentations in the mold surface, alternative machining techniques such as for example electrical discharge machining may be used for this purpose.

Figure 26:
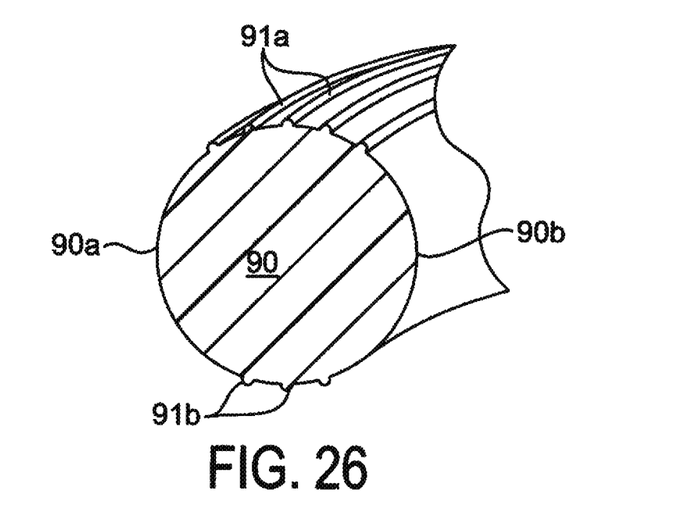
FIG. 26 is a cross sectional perspective view of a portion of an elastomeric O-ring having a surface portion formed according to certain aspects of the present invention.

Referring now to FIG. 26, an elastomeric polymeric O-ring 90 is illustrated. The O-ring 90 is annular in shape and has a generally circular cross section. Generally smooth inner and outer surfaces 90a and 90b of the O-ring 90 provide sealing surfaces that seal against stationary or movable members (not shown) when the O-ring 90 is installed. Surfaces 91a and 91b that are substantially adjacent the sealing surfaces 90a and 90b are provided with precision formed micro-channels to decrease the heat-generated adhesion between surfaces 91a and 91b and any adjacent surfaces against which they may be compressed. Increasing the surface area of surfaces 91a and 91b with micro-channels (which are enlarged in FIG. 26 for illustrative purposes) may reduce this sticking force while still maintaining a fluid tight seal. This sticking force is referred to as "stiction." The micro-channels of the seal 90 may be formed by the processes described above.

Figure 27:
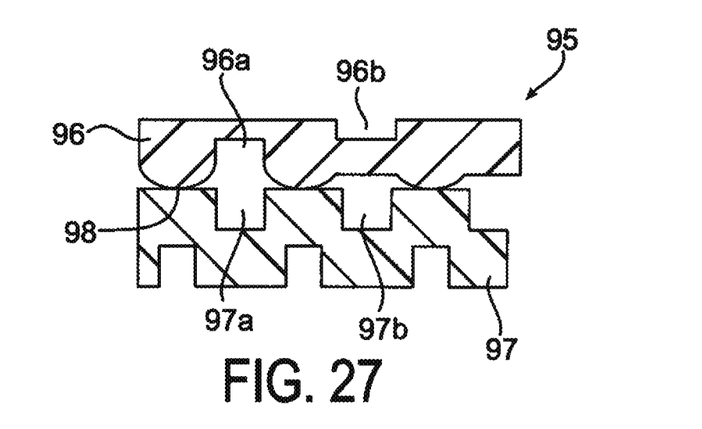
FIG. 27 is a cross sectional view of a fluidic microchannel structure according to certain aspects of the present invention.

Referring now to FIG. 27, a microfluidic circuit structure 95 is illustrated. The structure 95 includes first and second circuit layers 96 and 97. The layer 96 includes fluid channels 96a and 96b, and the layer 97 includes fluid channels 97a and 97b. The fluid channels 96a and 97a are defined by adjacent continuous walls or pillars, and the layers 96 and 97 are compressed together at sealing surface 98. The layers according to certain aspects of the present invention are preferably formed by the method illustrated in FIG. 25. The portions of the layers 96 and 97 substantially adjacent the sealing surface 98 may be hydrophobic or superhydrophobic, to repel fluid away from the sealing surface 98. Fluidic micro-channels as illustrated in FIG. 27 may be arranged into a network on a single plane or multiple planes with elastomeric compression areas isolating the fluid channel without requiring adhesion of multiple planes of fluidic networks. This architectural freedom may expand the permutations of fluidic control paths and networks that can be created by strategic rotations of the multiple planes in respect to each other.

Presently preferred embodiments of the invention are shown in the drawings and described in detail above. The invention is not, however, limited to these specific embodiments. Various changes and modifications can be made to this invention without departing from its teachings, and the scope of this invention is defined by the claims set out below.

What is claimed is:

1. A seal for contact against a mating member, the seal comprising an annular seal member formed of an elastomeric polymeric material and having a longitudinal axis, the seal member having a longitudinally facing annular sealing surface surrounding a central opening through the seal and a radially facing annular fluid repelling surface contiguous with the sealing surface, the fluid repelling surface having a pattern of microstructures formed thereinto, the microstructures rendering the fluid repelling surface as being hydrophobic or superhydrophobic, and the fluid repelling surface terminating at a curved surface of the fluid repelling surface that tangentially transitions to the sealing surface, wherein the seal is a dynamic seal.

2. The seal of claim 1 wherein the microstructures are formed as a pattern of pillars.

3. The seal of claim 1 wherein the microstructures are formed as a pattern of pillars, and the pattern includes aligned rows and columns of the pillars.

4. The seal of claim 1 wherein the microstructures are formed as a pattern of pillars, and the pattern includes offset rows and columns of the pillars.

5. The seal of claim 1 wherein the surface area of the fluid repelling surface is substantially greater than the surface area of the sealing surface.

6. The seal of claim 5 wherein the surface area of the fluid repelling surface is more than two times the surface area of the sealing surface.

7. The seal of claim 1, wherein the microstructures are formed by and during molding a shape of the seal.

8. The seal of claim 1, wherein the microstructures are formed by micromachining the fluid repelling surface of the seal.

9. The seal of claim 8, wherein the micromachining includes laser ablating the fluid repelling surface of the seal.

10. The seal of claim 1, in combination with the mating member, the mating member having a sealing surface perpendicular to the longitudinal axis of the seal member, and the sealing surface of the mating member being in contact with the sealing surface of the seal member and not with the fluid repelling surface of the seal member.

11. The seal of claim 10, wherein the seal is in substantially greater longitudinal compression than radial compression.

12. The seal of claim 10, wherein the microstructures are formed as a pattern of pillars.

13. The seal of claim 10, wherein the surface area of the fluid repelling surface is more than two times the surface area of the sealing surface.

* * * * *